US010929536B2

(12) United States Patent
Morris

(10) Patent No.: US 10,929,536 B2
(45) Date of Patent: Feb. 23, 2021

(54) DETECTING MALWARE BASED ON ADDRESS RANGES

(71) Applicant: Infocyte, Inc., Austin, TX (US)

(72) Inventor: Ryan Brandt Morris, Benicia, CA (US)

(73) Assignee: Infocyte, Inc., Austin, TX (US)

( * ) Notice: Subject to any disclaimer, the term of this patent is extended or adjusted under 35 U.S.C. 154(b) by 167 days.

(21) Appl. No.: 16/132,222

(22) Filed: Sep. 14, 2018

(65) Prior Publication Data

US 2020/0089883 A1 Mar. 19, 2020

(51) Int. Cl.
G06F 21/52 (2013.01)
G06F 21/56 (2013.01)
G06F 21/55 (2013.01)
G06F 21/57 (2013.01)
G06F 9/54 (2006.01)

(52) U.S. Cl.
CPC .............. G06F 21/566 (2013.01); G06F 9/54 (2013.01); G06F 21/52 (2013.01); G06F 21/554 (2013.01); G06F 21/577 (2013.01)

(58) Field of Classification Search
CPC .......... G06F 9/54; G06F 21/554; G06F 21/52; G06F 21/566; G06F 21/577
See application file for complete search history.

(56) References Cited

U.S. PATENT DOCUMENTS

| 7,779,472 | B1 | 8/2010 | Lou |
| 8,479,276 | B1 | 7/2013 | Vaystikh et al. |
| 8,881,282 | B1 | 11/2014 | Aziz et al. |
| 9,177,153 | B1* | 11/2015 | Perrig ...................... G06F 21/57 |
| 9,961,102 | B2* | 5/2018 | Li ........................... G06F 21/566 |
| 10,489,592 | B1* | 11/2019 | Naamneh ............. G06F 12/1441 |
| 2004/0210817 | A1* | 10/2004 | Kapoor .................. G06F 21/577 714/763 |
| 2006/0288416 | A1 | 12/2006 | Costea et al. |
| 2008/0016314 | A1* | 1/2008 | Li ........................ G06F 12/1408 711/200 |
| 2011/0219450 | A1 | 9/2011 | McDougal et al. |
| 2015/0040223 | A1* | 2/2015 | Tobin ...................... G06F 21/56 726/23 |
| 2016/0212159 | A1* | 7/2016 | Gupta .................... H04L 63/145 |

(Continued)

*Primary Examiner* — Mohammad A Siddiqi
(74) *Attorney, Agent, or Firm* — Kowert, Hood, Munyon, Rankin & Goetzel, P.C.

(57) ABSTRACT

Techniques are disclosed relating to detecting potential malware. A computer system may access process information identifying a set of software modules stored in a memory space allocated for a computer process. The computer system may determine address ranges that are respectively associated with a software module and define a segment in the memory space where program instructions are stored corresponding to that software module. The computer system may access thread information specifying, for each of a set of threads, a start address that identifies a location from which an initial program instruction is to be retrieved to begin execution of that thread. The computer system may make a determination that a thread is associated with a start address identifying a location outside of all address ranges, but within the memory space. Based on the determination, the computer system may classify the thread as being associated with malicious activity.

13 Claims, 8 Drawing Sheets

(56) References Cited

U.S. PATENT DOCUMENTS

| | | | |
|---|---|---|---|
| 2016/0283720 A1* | 9/2016 | Chen | G06F 21/577 |
| 2016/0357958 A1* | 12/2016 | Guidry | G06F 21/53 |
| 2018/0018460 A1* | 1/2018 | Brown | G06F 21/554 |
| 2018/0089109 A1* | 3/2018 | Vorobyov | G06F 21/52 |
| 2018/0107765 A1* | 4/2018 | Darbari | G06F 30/39 |
| 2018/0136868 A1* | 5/2018 | Tsirkin | G06F 13/16 |

* cited by examiner

DETECTING MALWARE BASED ON ADDRESS RANGES

BACKGROUND

Technical Field

This disclosure relates generally to detecting potential malware.

Description of the Related Art

Generally speaking, computer systems are designed to execute software for performing some desired task. Some users, however, have developed software intentionally designed to be malicious. Such software is broadly referred to as "malware." Malware often infects a user's computer system in order to cause damage to the system (e.g., by consuming system resources, corrupting files, etc.) or to gain access to that user's information (e.g., passwords, bank account information, personal information, etc.). Examples of malware include worms, Trojan horses, ransomware, and spyware. Malware may attempt to disguise itself so that it cannot be detected and removed from a computer system. In some instances, malware code may be copied into a memory space allocated for a legitimated application and then may be executed. Because that malware is contained within the memory space of the legitimate application, any activities that occur because of the malware code appear to be legitimate activities.

As explained above, malware often attempts to prevent its detection and removal from a system by injecting malware code into the memory space of a legitimate application. Thus, it may be desirable to detect that malware code and then remove it from the system. One prior approach (referred to as "file header scanning") for detecting potential malware is to inspect regions in a memory space that are marked as read, write, and executable for known executable file headers. This approach, however, can be defeated by overwriting the information specified in the file headers. Another approach used for detecting potential malware is to determine how code is loaded into the memory space (e.g., from a local disk or an outside location) by looking at flags. This approach, however, can be defeated by using a driver to report an incorrect flag (e.g., by reporting a false commit status)—thus deceiving the computer system.

Figure 1:
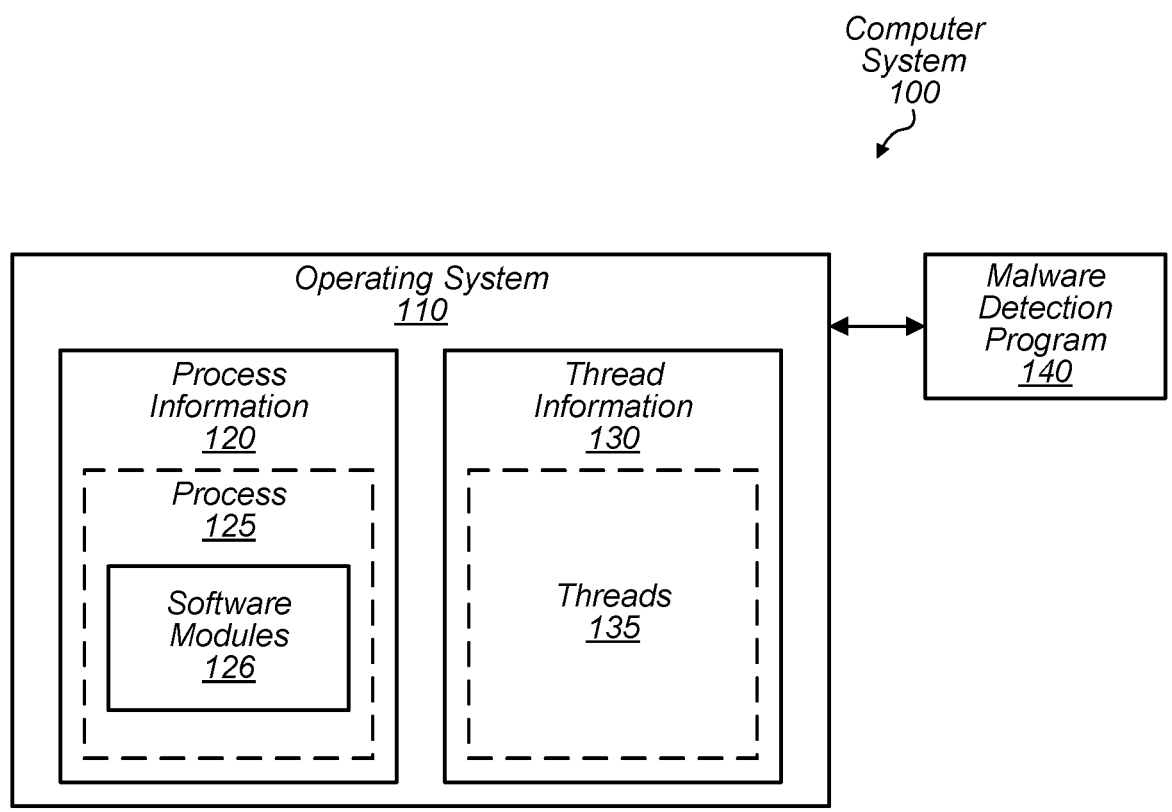
FIG. 1 is a block diagram illustrating example elements of a computer system capable of detecting potential malware, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computer system that executes multiple threads, the terms "first" thread and "second" thread can be used to refer to any of the multiple threads. In other words, the first and second threads are not limited to the initial two threads.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes techniques for detecting potential malware, including malware code and any threads executing the malware code. In various embodiments described below, a computer system determines a set of address ranges associated with software modules of a computer process and then determines whether the start address for the threads executing on that computer system falls within at least one of the address ranges (and the memory space allocated for that computer process). If the start address of a thread falls within at least one of the address ranges, then the thread may be deemed to be legitimate. But if the start address of a thread falls outside of all the address ranges and is within the memory space allocated for the computer process, then the thread may be classified as potentially malicious (i.e., potential malware). In various embodiments, the computer system loops through all computer processes running on the computer system to compare the address ranges of their software modules with the start address of each thread. In some embodiments, the computer code associated with the execution of a thread that has been deemed potentially malicious is extracted from the memory of the computer system and then further analyzed to determine if it is actual malware.

These techniques may be advantageous over prior approaches as these techniques allow for the detection of malware that has disguised itself using traditional methods. This is, these techniques may detect malware even if it has, for example, overwritten header information or modified operating system flags to circumvent prior approaches. Moreover, malware authors may not be able to modify the start address of a thread executing malware and thus may not be able to prevent their malware from being detected by the techniques discussed herein. These techniques may further result in a larger coverage of true positive scenarios than compared to traditional methods. A system for implementing these techniques will now be discussed below, starting with FIG. 1.

Turning now to FIG. 1, a block diagram of a computer system 100 is shown. Computer system 100 is a set of components that are implemented through hardware or a combination of hardware and software routines. In the illustrated embodiment, computer system 100 includes an operating system (OS) 110, process information 120, thread information 130, and a malware detection program 140. As further shown, process information 120 includes information that relates to a process 125, including information relating to software modules 126 of that process, and thread information 130 includes information that relates to threads 135. While information 120 and 130 are shown separately, they may be part of the same block of information. In some embodiments, computer system 100 may be implemented differently than shown. For example, malware detection program 140 may be executing on a different system coupled to computer system 100.

Operating system 110, in various embodiments, is a set of software routines executable to manage the operations of a computer system 100, including the allocation of processes 125 and their threads 135 for execution. A process 125, in various embodiments, is an instance of a set of software routines (e.g., a mobile application) allocated for execution by a processor of computer system 100. Allocating a process 125 may involve allocating at least one thread 135 for execution for that process. A thread 135, in various embodiments, is a thread of execution corresponding to a sequence of program instructions that may be managed by operating system 110. In order to manage processes 125 and threads 135, operating system 110 may have access to or maintain process information 120 and thread information 130.

Process information 120, in various embodiments, includes information describing the processes 125 allocated for execution. This information may include, for a given process 125, the state of that process (e.g., ready, blocked, running, etc.), a program counter, a stack pointer, register contents, the statuses of open files, a process identifier value, etc. Accordingly, process information 120 may correspond to the information stored in a process control block (or, in the context of the WINDOWS NT operating system family, a process environment block). Process information 120 may define, for a process 125, a set of software modules 126 that correspond to that process. A software module 126, in some embodiments, is a dynamic-link library (DLL) file or an executable file.

Thread information 130, in various embodiments, includes information describing the threads 135 allocated for execution. This information may include, for a given thread 135, the state of the thread, a program counter, a stack pointer, a pointer to the process control block of the process 125 corresponding to that thread, a thread identifier value, etc. Accordingly, thread information 130 may correspond to the information stored in a thread control block. In various embodiments, thread information 130 identifies, for a thread 135, a start address that indicates a location in memory of computer system 100 where an initial program instruction is retrieved when beginning execution of that thread.

Malware detection program 140, in various embodiments, is a set of software routines executable to detect potential malware, including malware code and threads 135 executing that malware code. In some embodiments, in order to detect potential malware, malware detection program 140 communicates with operating system 110 to access process information 120 and thread information 130. The communication between program 140 and operating system 110 may be achieved via an application programming interface (API) that is supported by operating system 110. Examples of API calls that may be by malware detection program 140 to operating system 110 are described in detail below with respect to FIG. 2.

In order to determine if a thread 135 is potentially malicious, in various embodiments, malware detection program 140 determines if that thread is executing program instructions that are outside of the software modules 126 of processes 125. That is, a thread 135 may be deemed (or classified) as potentially malicious if it is executing within the memory space allocated for a process 125, but not within the software modules 126 of that process. Additionally, through that determination, malware detection program 140 may detect potentially malicious program instructions (i.e., potential malware). Accordingly, malware detection program 140, in various embodiments, accesses process information 120 for determining the software modules 126 of processes 125.

After accessing process information 120 and determining the software modules 126 of processes 125, malware detection program 140 may determine address ranges that correspond to the software modules 126 of processes 125. An address range may define a segment within the memory of computer system 100 where program instructions are stored that correspond to a software module 126. These address ranges may identify valid locations that are acceptable for spawning threads 135.

In various embodiments, malware detection program 140 accesses thread information 130 to determine a start address for a thread 135. The start address may define a location in the memory of computer system 100 from which an initial program instruction is to be retrieved to begin execution of a thread 135. Malware detection program 140, in various embodiments, compares the start address for a thread 135 with the address ranges that correspond to software modules 126. If the start address for a certain thread 135 is not within the address ranges, then that thread 135 may be classified as potentially malicious; otherwise, that thread 135 may be deemed normal. In some embodiments, threads 135 that are classified as potentially malicious are further analyzed to determine if they are malicious.

In some cases, malware detection program 140 may determine whether threads 135 are potentially malicious on a process-by-process basis. That is, malware detection program 140 may determine the address ranges that correspond to the software modules 126 (e.g., determine the code sections of modules 126, which may exclude the headers of those modules 126) of a particular process 125. Malware detection program 140 may then compare the start addresses of threads 135 with those address ranges. If the start address for a thread 135 is not within the memory space of the particular process 125 or the start address is within one of the address ranges, then that thread 135 may be classified as normal. If the start address, however, is within the memory space of that particular process 125, but not within one of the address ranges, then that thread 135 may be classified as potentially malicious. Malware detection program 140 may then move onto the next process 125, comparing the start addresses of threads 135 with the address ranges corresponding to the software modules 126 of that process.

Implementing a computer system 100 in this manner may be advantageous over prior approaches as it may allow for the detection of malware where prior approaches fail. In many cases, the information that identifies a thread's entry point (start address) is difficult to change and thus, malware authors are unlikely to be able to spoof the entry point. If a thread's entry point is outside of the code segments corresponding to software modules 126, then that thread may be classified as potentially malicious as it has been injected into a legitimate process. A discussion of a layout of a process in memory will now be discussed in greater detail below.

Figure 2:
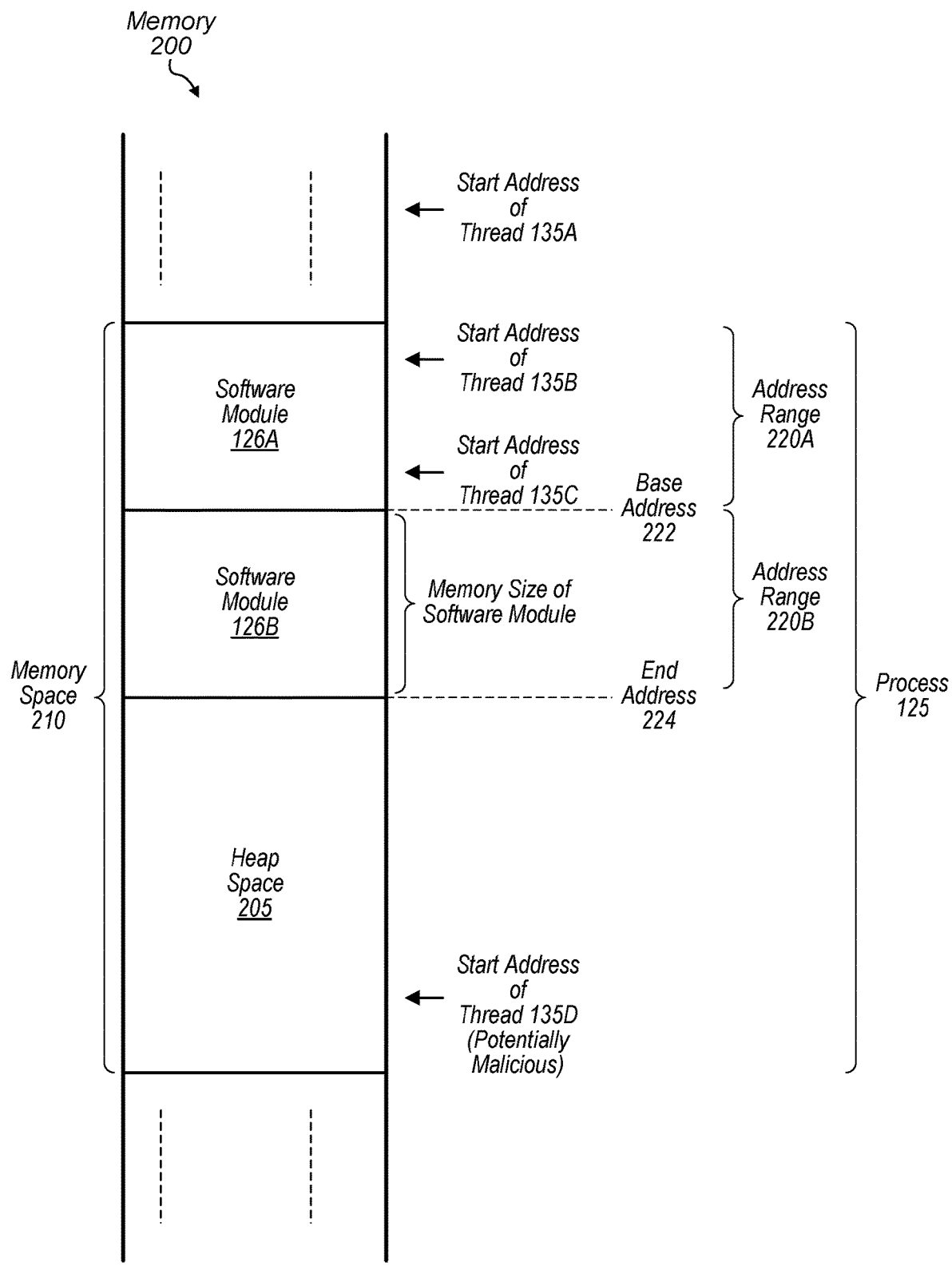
FIG. 2 is a block diagram illustrating example elements of a layout for a memory storing software modules, according to some embodiments.

Turning now to FIG. 2, a block diagram of an example layout of the software modules 126 in a memory 200 is shown. In the illustrated embodiment, memory 200 includes a memory space 210 having software modules 126A and 126B and a heap space 205. As further shown, the start address for thread 135A is outside of memory space 210 and the start address for each thread 135B-D is within memory space 210. In some embodiments, the layout of memory 200 may be different—e.g., software modules 126 may not be continuous in memory 200.

Memory 200, in various embodiments, is a non-transitory computer-readable medium capable of storing program instructions for one or more processes 125. Memory 200 may be, for example, random access memory (RAM). In various embodiments, operating system 110 allocates a range of addresses (shown as memory space 210) in memory 200 for a process 125 so that software modules 126 (which include program instructions) and other information for that process 125 can be loaded into memory 200. Accordingly, when initializing a process 125, operating system 110 may allocate a memory space 210 and then store software modules 126 in that memory space 210.

In various embodiments, operating system 110 maintains process information 120 that identifies software modules 126 loaded into the memory space 210 of a process 125. Process information 120 may include (or be used to access) module information specifying, for a given software module 126, a base address 222 and a memory size for that software module. In some embodiments, such information may be accessible to malware detection program 140 through a set of API calls to operating system 110. For example, malware detection program 140 may execute an "OpenProcess" function call that accepts a process identifier as an input and returns a handle (i.e., a reference to a resource) for the process associated with that identifier. Malware detection program 140 may execute an "EnumProcessModulesEx" function call that accepts a process handle as an input and returns a set of module handles that correspond to the software modules 126 of that process. Accordingly, malware detection program 140 may then execute a "GetModuleInformation" function call that accepts a module handle as an input and returns the module information for the corresponding module. Within the WINDOWS OS context, the module information may come from the module's Portable Executable header.

Accordingly, when determining the address range for a module 126, malware detection program 140 may execute the appropriate functions calls (discussed above), passing the inputs to operating system 110 and receiving the outputs (e.g., process handles, module handles, etc.), in order to obtain the module information for that module. In various embodiments, the module information specifies a base address 222 and a memory size (e.g., the size of the linear space that the module occupies, in bytes) for the corresponding software module 126. Accordingly, an end address 224 may be determined by adding the memory size of the software module 126 to the base address 222 of the software module 126. In some instances, the module information may indicate both a base address 222 and an end address 224. The base address 222 and the end address 224 for a software module 126 may define an address range 220 for that software module. As depicted, address range 220B for software module 126B includes addresses from base address 222 to end address 224.

In various embodiments, operating system 110 maintains thread information 130 that identifies a start address for each thread 135 that is allocated for execution. In a similar manner to accessing processing information 120, in various embodiments, malware detection program 140 accesses thread information 130 through a set of API calls to operating system 110. For example, program 140 may execute a "CreateToolhelp32Snapshot" function call that accepts a process 125 identifier as an input and returns a "snapshot" handle usable for accessing threads 135 of that process. Program 140 may then execute a "Thread32First" function call that accepts the snapshot handle as an input and returns information about the first thread 135, including an identifier for that thread, of the corresponding process 125. Program 140 may then execute an "OpenThread" function call that accepts a thread identifier as an input and returns a handle for the thread associated with that identifier. Malware detection program 140 may then execute "NtQueryInformationThread" function call that accepts a thread handle as an input and returns a start address for the thread corresponding to the thread handle. In some cases, program 140 may execute a "Thread32Next" function that returns the next thread 135 for the snapshot and then repeats the appropriate functions to obtain the start address for that thread. Program 140 may also move to the next process and repeat the appropriate functions to evaluate its threads 135.

After determining address ranges 220 and the start addresses for threads 135, in various embodiments, malware detection program 140 determines whether each of the start addresses identifies a location in memory 200 that falls within at least one of the address ranges 220 of software modules 126. As shown, threads 135B and 135C have a start address that falls within address ranges 220A of software module 126A. Accordingly, malware detection program 140 may classify those threads as normal. As further depicted, thread 135D has a start address that falls within heap space 205 and not within any address range 220. Accordingly, program 140 may classify thread 135D as potentially malicious. Note that thread 135D may be spawned by a process 125 different than the one to which memory space 210 is allocated. As further shown, thread 135A has a start address that falls outside of memory space 210 and thus may not be classified a potentially malicious with respect to the process 125 associated with memory space 210. An example process 125 and software modules 126 will now be discussed.

Figure 3:
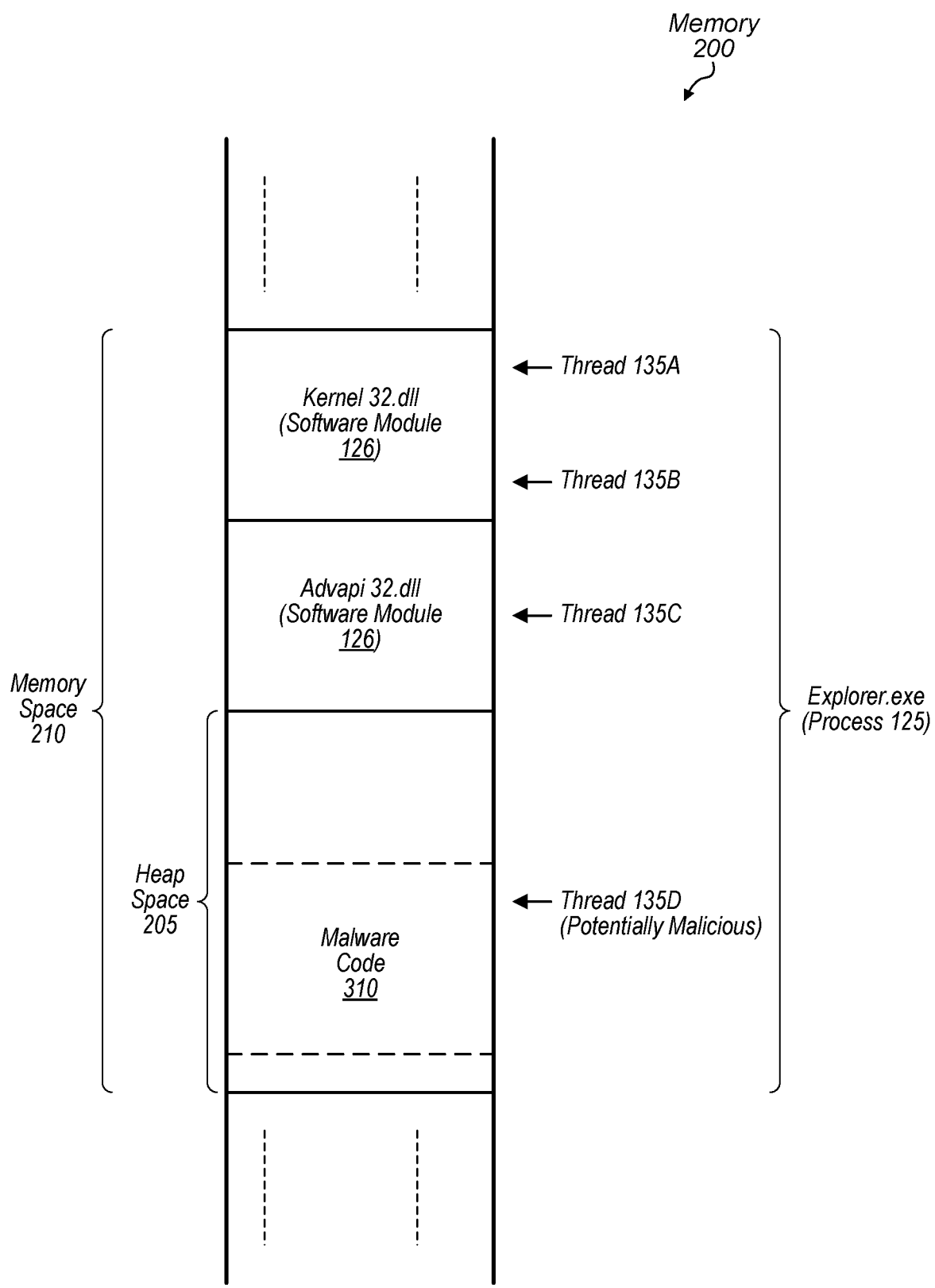
FIG. 3 is a block diagram illustrating an example of a process and its software modules in memory, according to some embodiments.

Turning now to FIG. 3, a block diagram of an example layout of an "explorer" process 125 in memory 200 is depicted. As shown, the memory space 210 of the explorer process 125 includes a "kernel32.dll" software module 126, an "advapi32.dll" software module 126, and a heap space 205. Malware detection program 140 may determine the address range 220 for both kernel32.dll and advapi32.dll using the appropriate API calls (discussed earlier). Program 140 may then determine whether the start address for any of threads 135 identifies a location that is outside of the determined address ranges 220. As depicted, the start address for thread 135D is outside of kernel32.dll and advapi32.dll. Thus, thread 135D may be classified as potentially malicious.

As mentioned earlier, program 140 may assist in determining whether a thread 135 that is classified as potentially malicious is actually malicious, including whether the code executed by that thread is malicious. In various embodiments, program 140 determines code 310 (i.e., program instructions) that corresponds to the execution of a thread 135 and then extracts that code for further analysis. This further analysis may include comparing code 310 against code that is known to be malware. If the extracted code 310 matches or is similar to known malware, then the corresponding thread 135 may be stopped and its code removed from memory 200. If the extracted code 310 does not match or is not similar to known malware, then the thread 135 may continue to be executed by computer system 100. In various embodiments, program 140 executes on computer system 100, but pushes results of its execution to a central system, which determines whether the results indicate actual malware. The particulars of the central system will now be discussed below.

Figure 4:
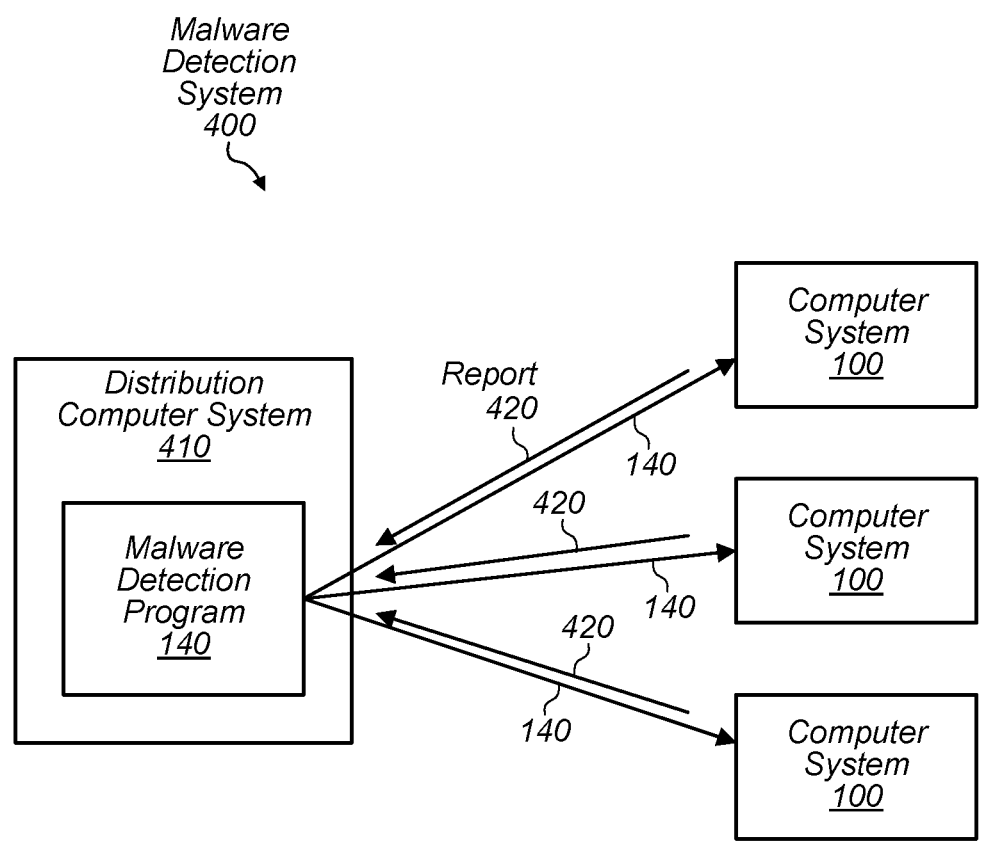
FIG. 4 is a block diagram illustrating example elements of a distribution computer system capable of distributing a malware detection program, according to some embodiments.

Turning now to FIG. 4, a block diagram of malware detection system 400 is shown. In the illustrated embodiment, system 400 includes a distribution computer system 410 and a set of computer systems 100 in communication with system 410. As shown, distribution computer system 410 includes malware detection program 140. In some embodiments, system 400 may be implemented differently than shown—e.g., malware detection program 140 may be stored at computer systems 100 instead of being sent to them by distribution computer system 410.

Distribution computer system 410, in various embodiments, is hardware or a collection of hardware and software routines that facilitates the monitoring of computer systems 100 for malware. In order to detect malware running on computer systems 100, in some embodiments, system 410 distributes malware detection program 140 to computer systems 100 that then may execute program 140 to detect potential malware. Executing program 140 may implement the techniques described above for detecting malicious threads 135, which may include generating a report 420. In various embodiments, report 420 includes information associated with threads 135 that are deemed potentially malicious—such information may include malware code 310 corresponding to the execution of a potentially malicious thread 135. Accordingly, computer systems 100 may send their reports 420 back to distribution computer system 410 for further analysis. After generating and sending report 420, in various embodiments, computer systems 100 delete malware detection program 140 from their system—e.g., program 140 may include program instructions that when executed cause program 140 to be removed from the computer system 100 on which it is executing.

Distribution computer system 410 may compare any malware code 310 included in a report 420 against known malware code. When distribution computer system 410 determines that malware has been detected for a particular computer system 100, in various embodiments, system 410 performs a protective action such as preventing the particular computer system 100 from communicating with other computer systems 100, disabling the user account being used on the particular computer system 100, etc. In this manner, distribution computer system 410 may prevent the malware on the particular computer system 100 from affecting other systems, including databases.

Figure 5:
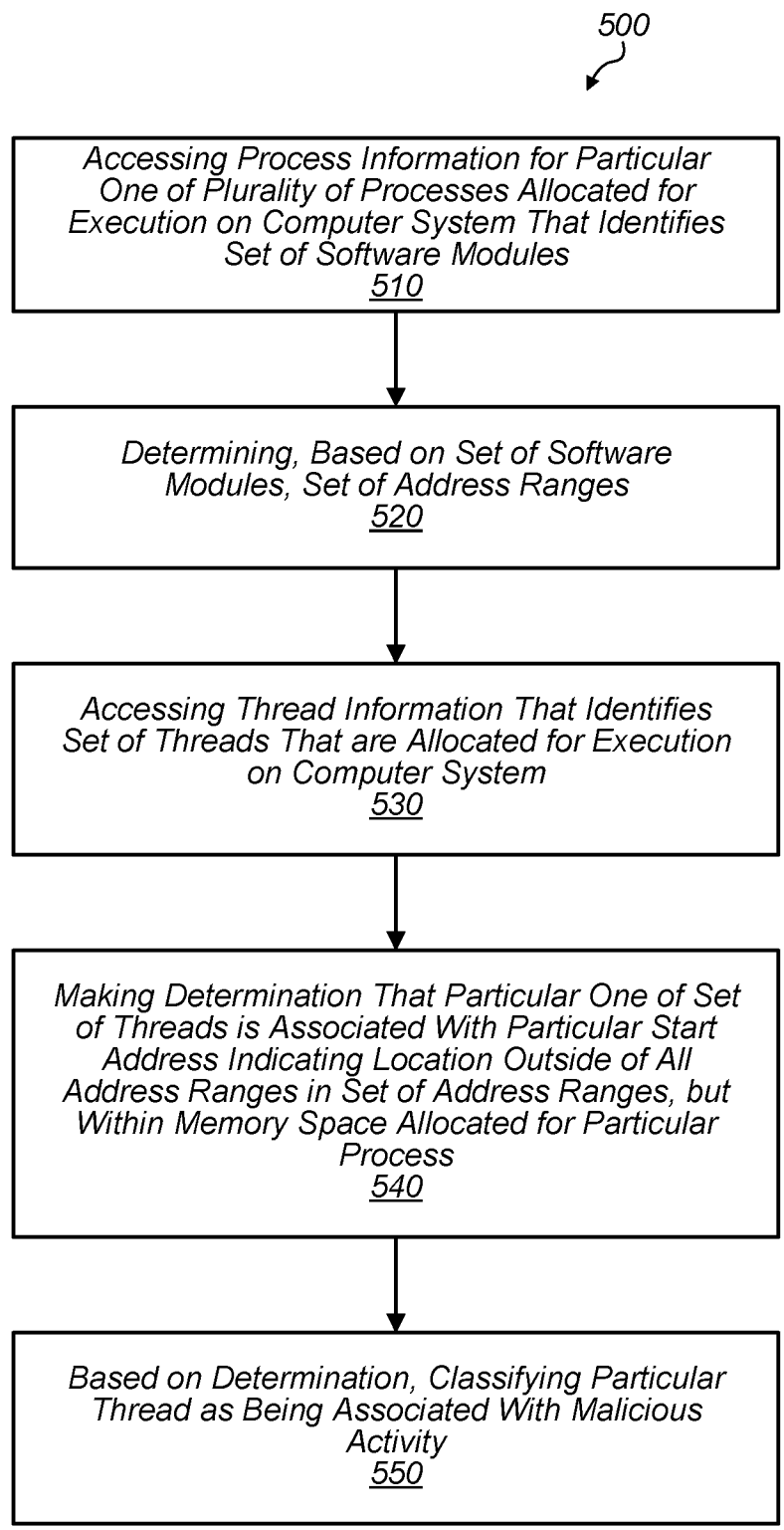
FIGS. 5-7 are flow diagrams illustrating example methods relating to detecting potential malware, according to some embodiments.

Turning now to FIG. 5, a flow diagram of a method 500 is shown. Method 500 is one embodiment of a method performed by a computer system (e.g., computer system 100) in order to detect potential malware. In some embodiments, method 500 is performed by the computer system in response to receiving a set of program instructions (e.g., malware detection program 140) from a distribution computer system (e.g., system 410). In some cases, method 500 may include additional steps—e.g., the computer system may extract malware code from memory of the computer system for further analysis.

Method 500 begins in step 510 with the computer system accessing process information (e.g., process information 120) for a particular one of a plurality of processes (e.g., processes 125) allocated for execution on the computer system. The process information may identify a set of software modules (e.g., software modules 136) stored in a memory space (e.g., memory space 210) allocated in memory (e.g., memory 200) of the computer system for the particular process.

In step 520, the computer system determines, based on the set of software modules, a set of address ranges (e.g., address ranges 220). Each address range may be associated with a software module and define a segment in the memory space where program instructions are stored that correspond to the software module. In order to determine that given address range, the computer system may access module information for the software module associated with the given address range. In some embodiments, the module information defines a base address (e.g., base address 222) and a memory size of the software module. Accordingly, the address range may be from the base address to an end address (e.g., end address 224) that is determined by adding the memory size of the software module to the base address.

In step 530, the computer system accesses thread information (e.g., thread information 130) that specifies, each one of a set of threads (e.g., threads 135) allocated for execution on the computer system, a start address that identifies a location in the memory from which an initial program instruction is to be retrieved in order to begin execution of that thread. In various embodiments, accessing the process information, the thread information, and the module information includes making application programming interface (API) calls to an operating system of the computer system.

In step 540, the computer system makes a determination that a particular one of the set of threads is associated with a particular start address indicating a location outside of all address ranges in the set of address ranges, but within the memory space allocated for the particular process.

In step 550, the computer system, based on the determination, classifies the particular thread as being associated with malicious activity. In some instances, this classification may be the final say on whether a thread is actual malware—i.e., this classification may identify a thread as actual malware. In other instances, this classification may be a step in a larger process for identifying whether a thread is actual malware. That is, this classification may identify a thread as a candidate for being malware without identifying it as actual malware. (In various instances, a final malware determination may be based on many different sub-determinations, one of which may be the disclosed embodiments.) Accordingly, the computer system may generate report information (e.g., report 420) that includes program instructions associated with the execution of the particular thread. The computer system may provide, to a different computer system, (e.g., distribution computer system 410) the report information for determining whether the particular thread is malicious (i.e., malware). In some cases, the particular thread may be spawned by a process different than the particular process.

In some embodiments, the computer system may receive, from the different computer system, program instructions (e.g., program 140) that are executable to perform method 700, including the accessing of the process information, the determining of the set of address ranges, the accessing of the thread information, the making of the determination, and the classifying of the particular thread. In response to the computer system executing the program instructions received from the different computer system, the computer system may then delete the program instructions.

Figure 6:
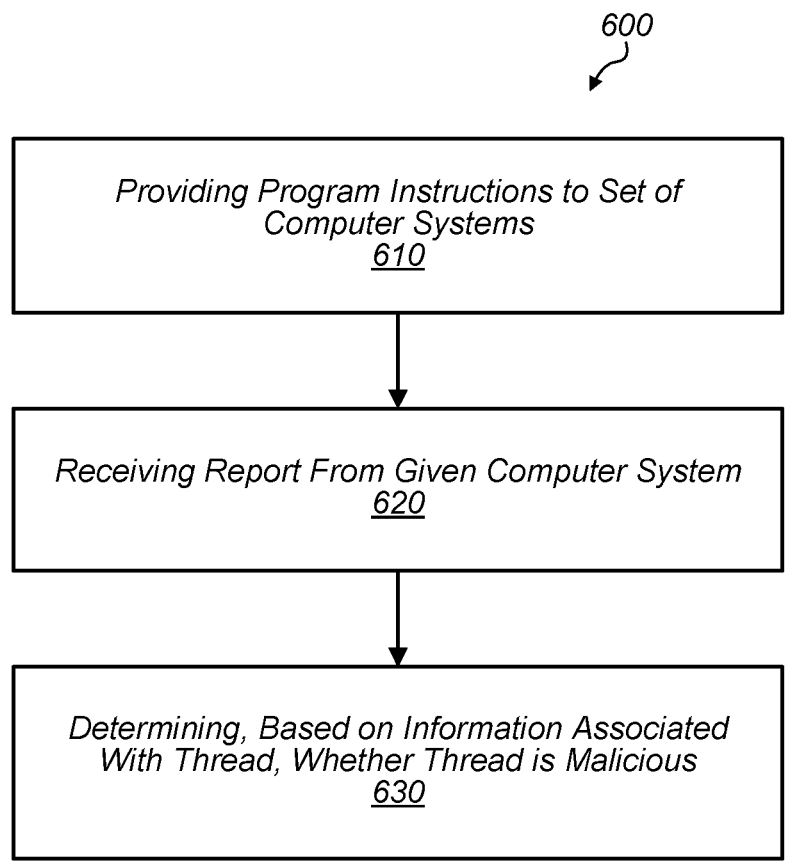

Turning now to FIG. 6, a flow diagram of a method 600 is shown. Method 600 is one embodiment of a method performed by a distribution computer system (e.g., system 410) for detecting potential malware in a set of computer systems (e.g., computer systems 100). In some cases, method 600 may include additional steps—e.g., the distribution computer system may compare program instructions (e.g., malware code 310) specified in a report from a computer system to sets of different program instructions, each of which has been classified as malware.

Method 600 begins in step 610 with a distribution computer system providing program instructions (e.g., program 140) to a set of computer systems.

In various embodiments, the program instructions are executable by a given one of the set of computer systems to determine a set of valid address ranges (e.g., address ranges 220) for software modules (e.g., software modules 126) associated with a particular process (e.g., a process 125). Each of the set of valid address ranges may define a segment of a memory space (e.g., memory space 210) allocated in memory (e.g., memory 200) of the given computer system for the particular process in which program instructions for a software module are stored. Determining a given one of the set of valid address ranges may include the given computer system accessing, for a software module associated with the particular process, data that specifies a base address (e.g., base address 222) of the software module and a memory size of the software module. Accordingly, the given valid address range may be defined as ranging from the base address of the software module to an end address (e.g., end address 224) that is determined by adding the memory size of the software module to the base address of the software module.

In various embodiments, the program instructions are executable by the given computer system to access information (e.g., thread information 130) that indicates a start address for a thread (e.g., a thread 135) allocated for execution on the given computer system. In various cases, the start address may identify a location in the memory of the given computer system from which an initial program instruction is to be retrieved in order to begin execution of the thread.

In various embodiments, the program instructions are executable by the given computer system to, based on the identified location being within the memory space allocated for the particular process, but not within any of the set of valid address ranges, determine to include information associated with the thread in a report (e.g., report 420) to be sent to the distribution computer system. That information may specify program instructions included in an execution sequence of the thread (e.g., the executable file being executed by the thread). In response to sending the report to the central computer system, the given computer system may delete the program instructions.

In step 620, the distribution computer system receives the report from the given computer system. In step 630, the distribution computer system determines, based on the information in the report, whether to classify the thread identified in the report as malware. In response to determining that the thread is malicious, the distribution computer system may cause the given computer system to be prevented from communicating with the other computer systems in the set of computer systems.

Figure 7:
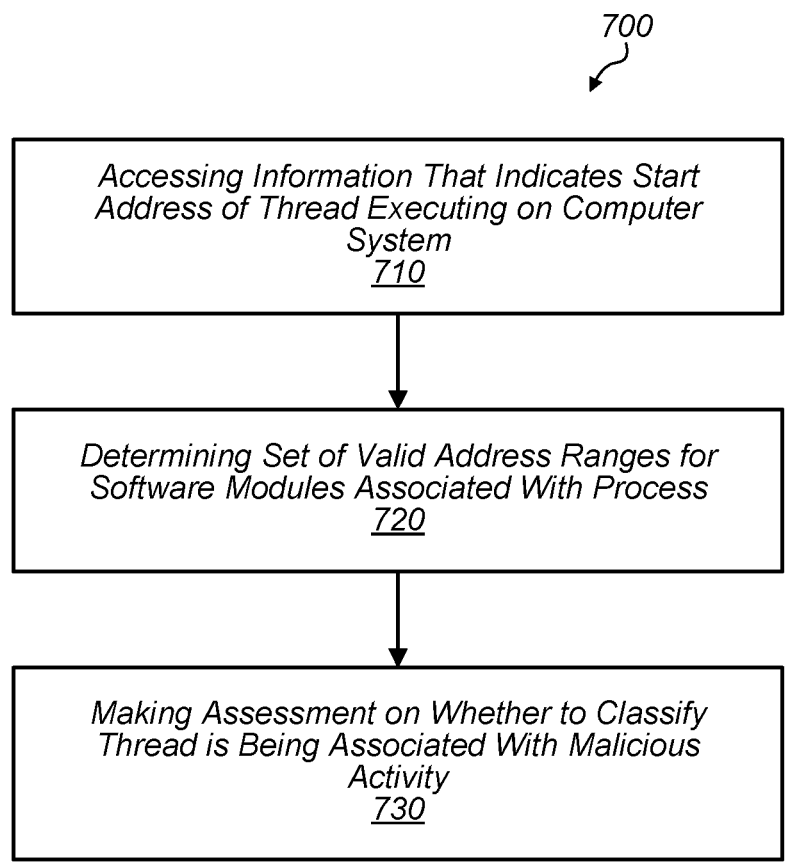

Turning now to FIG. 7, a flow diagram of a method 700 is shown. Method 700 is one embodiment of a method performed by a computer system (e.g., computer system 100) in order to detect potential malware. In some embodiments, method 700 is performed by the computer system in response to receiving a set of program instructions (e.g., malware detection program 140) from a distribution computer system (e.g., system 410). In some cases, method 700 may include additional steps—e.g., the computer system may extract malware code from memory (e.g., memory 200) of the computer system for further analysis.

Method 700 begins in step 710 with the computer system accessing information (e.g., thread information 130) that indicates a start address of a thread (e.g., a thread 135) executing on the computer system. The thread may be associated with a process (e.g., a process 125) and the start address may identify a particular location (e.g., a memory address) in the memory of the computer system from which an initial program instruction is to be retrieved in order to begin execution of the thread.

In step 720, the computer system determines a set of valid address ranges (e.g., address ranges 220) for software modules (e.g., software modules 126) associated with the process. A given valid address range, in some embodiments, is based on a base address (e.g., base address 222) of a given software module and a memory size of the given software module. Determining the given valid address may include calculating an end address (e.g., end address 224) for the given software module by adding the memory size of the given software module to the base address of the given software module and determining the given valid address range as ranging from the base address of the given software module to the end address of the given software module.

In step 730, the computer system makes an assessment on whether to classify the thread is being associated with malicious activity. In various embodiments, the assessment is based on the particular location identified by the start address and the set of valid address ranges. In some embodiments, making the assessment includes the computer system determining whether the particular location is within at least one of the set of valid address ranges and within a memory space allocated for the process. In response to determining that the particular location is outside of all valid address ranges in the set of valid address ranges, but is within the memory space allocated for the process, the computer system may cause program instructions included in an execution sequence of the thread to be analyzed for malicious properties. Additionally, the computer system may prevent execution of the thread.

Exemplary Computer System

Figure 8:
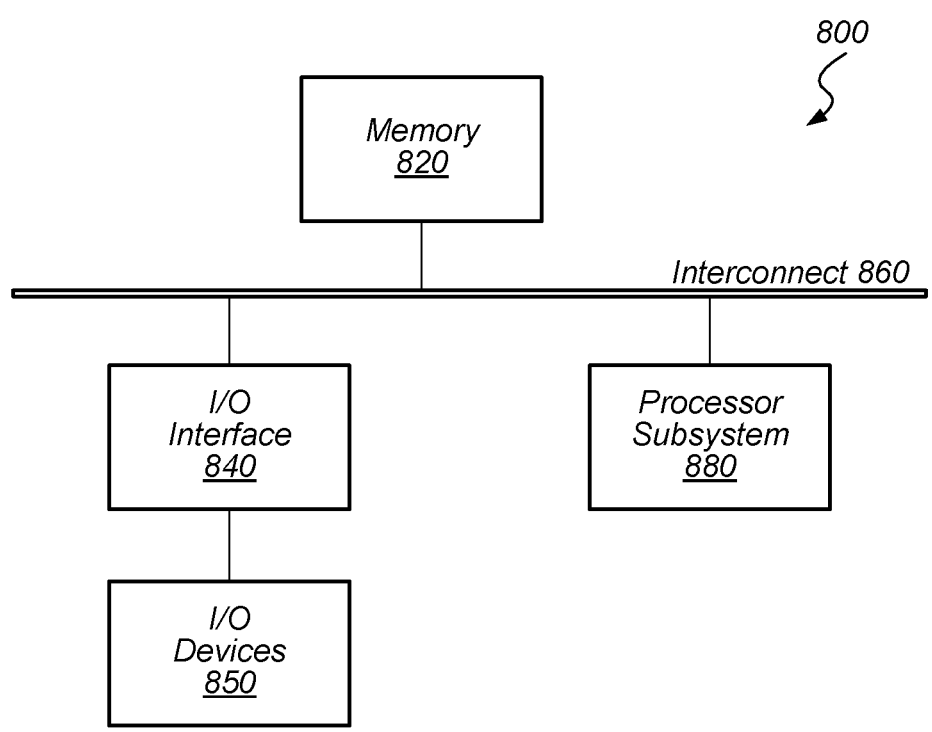
FIG. 8 is a block diagram illustrating an example computer system, according to some embodiments.

Turning now to FIG. 8, a block diagram of an exemplary computer system 800, which may implement computer system 100 and/or distribution computer system 410, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement operating system 110 and malware detection program 140 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
  receiving, by a computer system from a remote computer system, particular program instructions that are executable to cause the computer system to perform operations comprising:
    accessing, for a process allocated for execution on the computer system, process information that identifies a set of software modules stored in a memory space allocated in memory of the computer system for the process;
    determining, based on the set of software modules, a set of address ranges, wherein a given address range defines a segment in the memory space where program instructions are stored for a corresponding software module;
    accessing thread information that specifies, for each one of a plurality of threads allocated for execution on the computer system, a start address that identifies a location in the memory from which an initial program instruction is to be retrieved in order to begin execution of that thread;
    comparing the start address of each one of the plurality of threads with the set of address ranges;
    based on the comparing, making a determination that a particular one of the plurality of threads is associated with a start address indicating a location outside of all address ranges in the set of address ranges, but within a heap space of the memory space allocated for the process; and
    based on the determination, generating report information that includes program instructions pertaining to an execution of the particular thread; and
  providing, to the remote computer system, the report information for determining whether the particular thread is malicious based on the program instructions included in the report information; and after the providing, deleting the particular program instructions; and in response to receiving the particular program instructions, the computer system executing the particular program instructions.

2. The method of claim 1, wherein determining the given address range includes:

accessing, by the computer system, module information defining a base address of the corresponding software module and a memory size of the corresponding software module.

3. The method of claim 2, wherein the given address range is from the base address to an end address, wherein the end address is determined by adding the memory size of the corresponding software module to the base address.

4. The method of claim 2, wherein accessing the process information, the thread information, and the module information includes making application programming interface (API) calls to an operating system of the computer system.

5. The method of claim 1, wherein the particular thread is spawned by a different process than the process.

6. A method, comprising:

providing, by a distribution computer system, program instructions to a set of computer systems, wherein the program instructions are executable by a given one of the set of computer systems to perform operations comprising:

determining a set of valid address ranges for software modules associated with a particular process, wherein each of the set of valid address ranges defines a segment of a memory space allocated in memory of the given computer system for the particular process in which program instructions for a software module are stored;

accessing information indicating a start address for a thread allocated for execution on the given computer system, wherein the start address identifies a location in the memory of the given computer system from which an initial program instruction is to be retrieved in order to begin execution of the thread;

based on the identified location being within a heap space of the memory space allocated for the particular process, but not within any of the set of valid address ranges, determining to include particular program instructions of an execution sequence of the thread in report information to be sent to the distribution computer system;

providing the report information to the distribution computer system for determining whether the thread is malicious; and after the providing, deleting the program instructions provided by the distribution computer system;

receiving, by the distribution computer system, the report information from the given computer system; and determining, by the distribution computer system based on the particular program instructions included in the report information, whether to classify the thread as malware.

7. The method of claim 6, wherein determining a given one of the set of valid address ranges includes:

accessing, for a particular software module associated with the particular process, data that specifies a base address of the particular software module and a memory size of the particular software module; and defining the given valid address range as ranging from the base address of the particular software module to an end address determined by adding the memory size of the particular software module to the base address of the particular software module.

8. The method of claim 6, further comprising:

in response to determining that the thread is malicious, the distribution computer system causing the given computer system to be prevented from communicating with the other computer systems in the set of computer systems.

9. The method of claim 6, wherein determining whether the thread is malicious includes:

comparing, by the distribution computer system, the particular program instructions with sets of different program instructions, each of which has been classified as malware.

10. A non-transitory computer-readable medium having first program instructions stored thereon that are executable by a computer system to perform operations comprising:

accessing information that indicates a start address of a thread executing on the computer system, wherein the thread is associated with a process, and wherein the start address identifies a particular location in a memory of the computer system from which an initial program instruction is to be retrieved in order to begin execution of the thread;

determining a set of valid address ranges for software modules associated with the process, wherein each of the set of valid address ranges is based on a base address of a respective software module and a memory size of that respective software module; and making a determination that the particular location of the start address of the thread is outside of all address ranges in the set of valid address ranges, but within a heap space of a memory space allocated for the process based on the determination, generating report information that includes second program instructions pertaining to an execution of the thread; and providing, to a remote computer system, the report information for determining whether the thread is malicious based on the second program instructions; and after the providing, deleting the first program instructions.

11. The non-transitory computer-readable medium of claim 10, wherein accessing information that indicates a start address for the thread includes:

making a first application programming interface (API) call, to an operating system of the computer system, to receive thread information that indicates a plurality of threads executing on the computer system;

making a second API call, to the operating system, to receive a thread handle that is usable to access information associated with the thread, wherein the second API call includes a portion of the thread information; and making a third API call, to the operating system, to receive the information indicating the start address for the thread, wherein the third API call includes the thread handle.

12. The non-transitory computer-readable medium of claim 10, wherein determining a given one of the set of valid address ranges includes:

calculating an end address for a particular software module corresponding to the given valid address range by adding the memory size of the particular software module to the base address of the particular software module; and determining the given valid address range as ranging from the base address of the particular software module to the end address of the particular software module.

13. The non-transitory computer-readable medium of claim 10, wherein the operations further comprise:

in response to making the determination, preventing execution of the thread.

* * * * *